No. 734,335. PATENTED JULY 21, 1903.
A. W. JOHNSON.
MEAT CUTTER.
APPLICATION FILED OCT. 9, 1902.
NO MODEL. 2 SHEETS—SHEET 1.
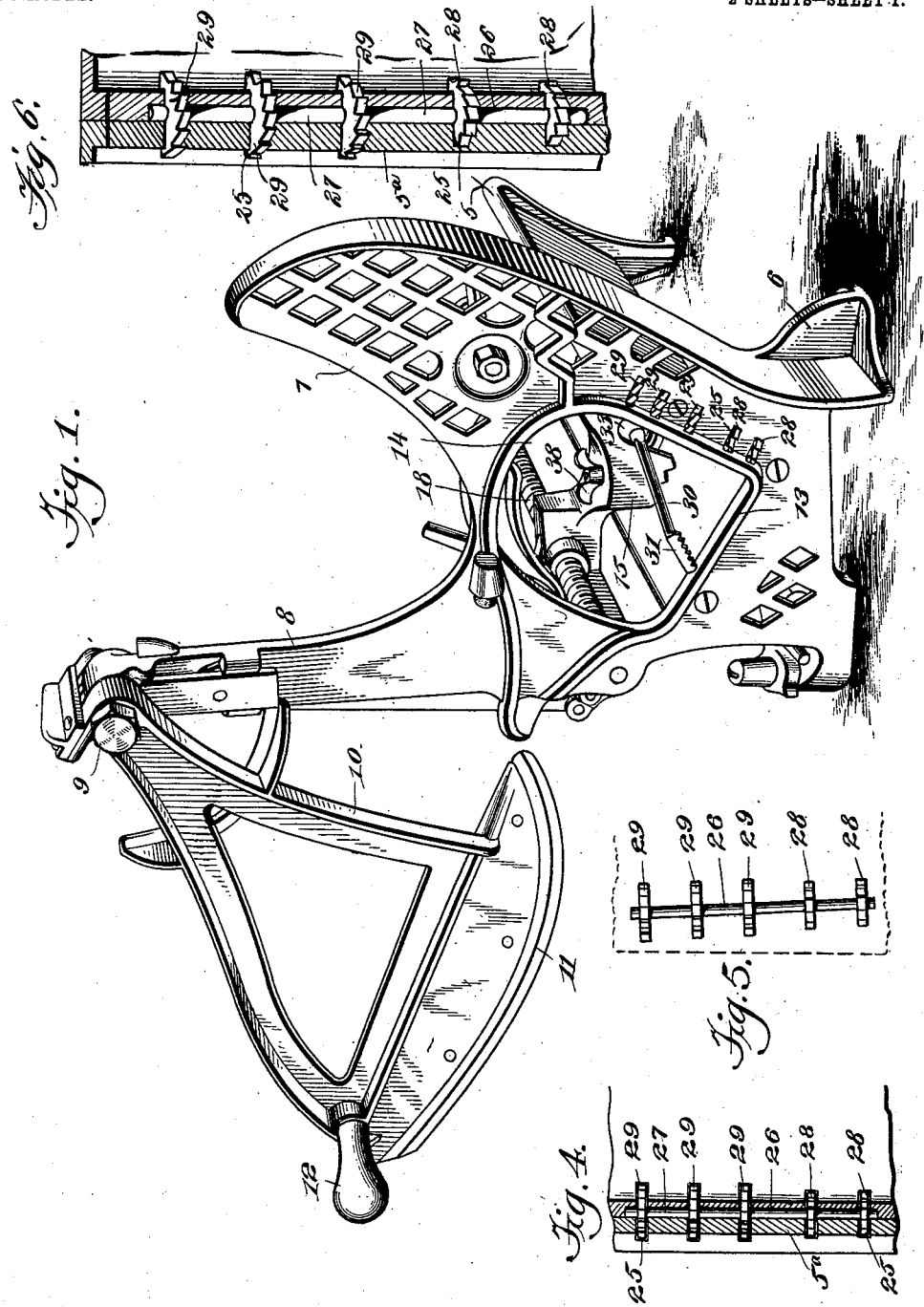
WITNESSES:
INVENTOR
Alfred W. Johnson
BY
ATTORNEYS.

No. 734,335. PATENTED JULY 21, 1903.
A. W. JOHNSON.
MEAT CUTTER.
APPLICATION FILED OCT. 9, 1902.
NO MODEL. 2 SHEETS—SHEET 2.
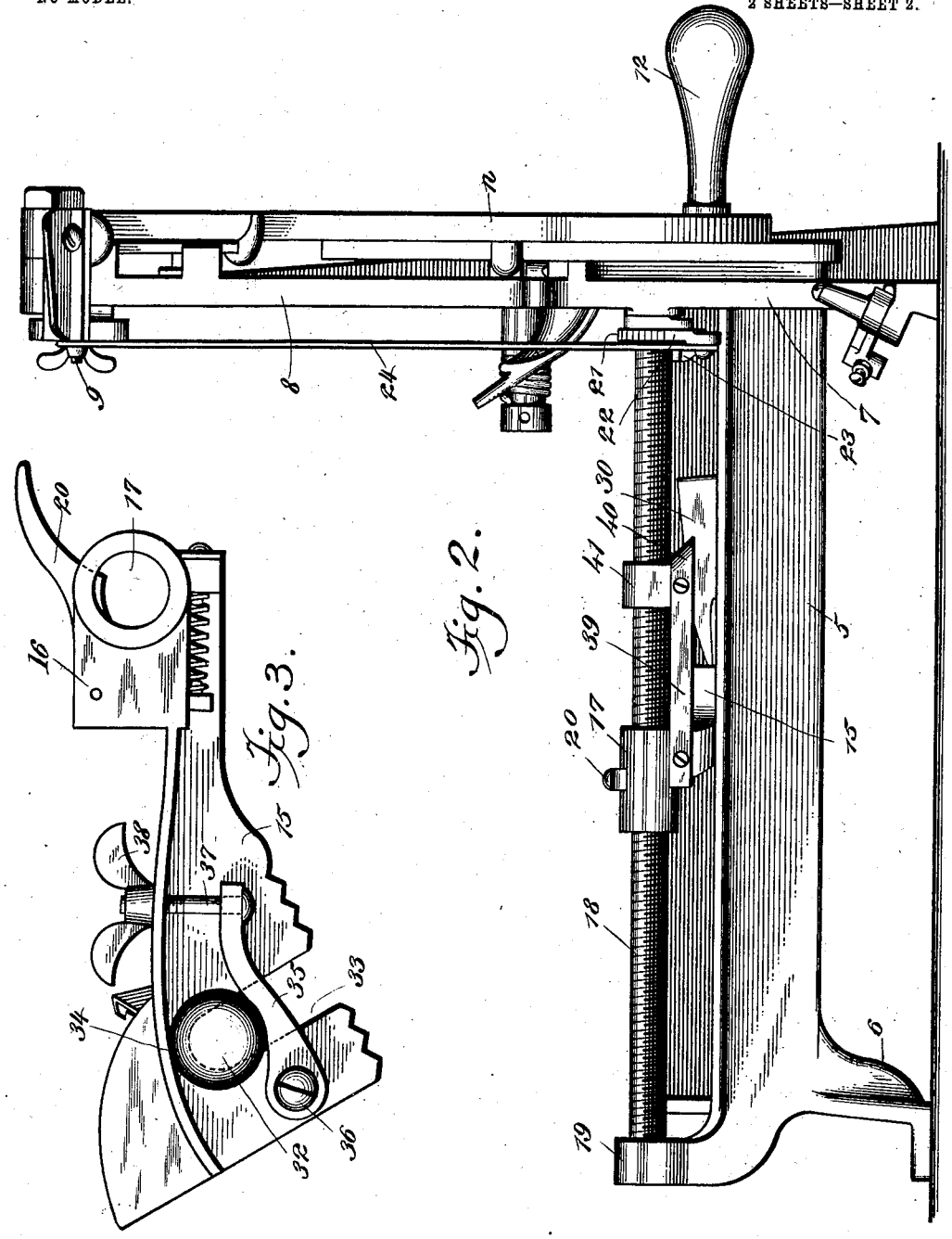
WITNESSES:
INVENTOR
Alfred W. Johnson
BY
ATTORNEYS.

No. 734,335.

Patented July 21, 1903.

UNITED STATES PATENT OFFICE.

ALFRED W. JOHNSON, OF NEW BRUNSWICK, NEW JERSEY.

MEAT-CUTTER.

SPECIFICATION forming part of Letters Patent No. 734,335, dated July 21, 1903.

Application filed October 9, 1902. Serial No. 126,437. (No model.)

*To all whom it may concern:*

Be it known that I, ALFRED W. JOHNSON, a citizen of the United States, and a resident of New Brunswick, in the county of Middlesex and State of New Jersey, have invented new and useful Improvements in Meat-Cutters, of which the following is a full, clear, and exact description.

My invention relates to improvements in meat-cutters of that class which employ a trough-shaped bed and a suitable type of cutter mechanism arranged to operate in a way to cut thin slices from dried beef or other meat placed on the bed.

One of the improvements which I have made resides in the provision of means auxiliary to the usual slide for feeding the material to the knife in a manner to make the latter cut slices uniform in thickness from the material. Ordinary meat-cutters which employ a slide advanced intermittently and in unison with the movement of the knife do not at all times regularly and uniformly advance the top and bottom parts of the meat, because the meat being soft and yielding is forced back at the top by the forward stroke of the knife, while that part of the meat at the bottom of the trough is advanced by the feed motion so that the meat is displaced and advanced, with the result that the slices are not uniform, but, on the contrary, they taper toward the upper end, thus causing the meat to be cut in an inclined direction, which in due course produces a pointed end, and this makes it necessary to invert or reverse the meat on the bed one or more times before it is all cut away.

My improvement overcomes the irregular feed of the meat, because it is gripped or held against displacement on the movement of the cutter, said improvement allowing the free or uninterrupted movement of the meat toward the cutter.

Another improvement which I have made resides in an adjustable claw, which is carried by the feed-slide and projects forwardly therefrom to engage the meat at the top or side and hold it in position, so as to assist in feeding the meat properly to the cutter, said claw being adjustable to any desired position in order to properly engage with meat of different sizes and shapes.

Further objects and advantages of the invention will appear in the course of the subjoined description and the novelty will be defined by the annexed claims.

Reference is to be had to the accompanying drawings, forming a part of this specification, in which similar characters of reference indicate corresponding parts in all the figures.

Figure 1 is a perspective view of a meat-cutter equipped with my improvements. Fig. 2 is a side elevation thereof. Fig. 3 is an enlarged detail view in elevation of a portion of the feed-slide equipped with a clamp adapted to adjustably confine the claw forming one of my improvements. Fig. 4 is a vertical section through one side of the feed-trough, illustrating the gang of toothed wheels forming another feature of my improvement. Fig. 5 is a detail view of the gang of toothed feed-wheels; and Fig. 6 is a perspective sectional view illustrating the revoluble feeder, which includes the gang of toothed wheels.

In order that others skilled in the art may understand my improvements, I have illustrated them in connection with an ordinary meat-slicer, and in the drawings, 5 designates a trough-shaped bed having the usual legs 6 and the upright frame-plate 7, said frame-plate having a post 8 extending upwardly a suitable distance to furnish a support for the pivotal bolt 9, on which is hung a cutter-frame 10. This cutter-frame is provided with a knife or blade 11 and with a handle 12, and said cutter-frame and its blade are arranged to traverse a flange 13, which bounds the delivery-opening 14 in the upright frame-plate 7. In the trough-shaped bed 5 is arranged a feed-slide 15, a part of which is shown by Fig. 3. This feed-slide is shaped to fit snugly in the bed, so as to have free slidable movement therein, and at one end the slide is provided with an arm 16, having a sleeve 17 for the accommodation of the feed-screw 18, the latter being journaled in suitable bearings 19 on the bed. The arm 16 of the feed-slide is provided with a toothed latch 20, the teeth of which extend into the sleeve 17 in order to have engagement with the threads on the feed-screw, thus making provision for the advancement of the slide when the screw is rotated. At one end this screw is provided with a ratchet 21, with which engages a pawl 22, carried by a lever 23, to which is attached a link 24, having connection with the swinging cutter-frame. This pawl-and-ratchet mechanism is similar to devices ordinary in this art, and I do not consider it necessary to more particularly describe and illustrate the same.

One of the slanting sides 5ª of the trough-shaped bed 5 is provided near the delivery-opening 14 with a series of slots 25, said slots being spaced at suitable intervals and opening through the inner face of the side 5ª, as shown by Figs. 4 and 6. The series of slots extend vertically from the bottom to the top of the slanting side, and in this side 5ª is provided a longitudinal opening or passage 26, the latter intersecting with the slots and forming an elongated bearing for a feed-shaft 27. This feed-shaft extends upwardly from the bottom of the bed 5, and it is free to rotate in the opening 26 thereof. The shaft carries a gang of feed-wheels, indicated at 28 29, (see Figs. 4, 5, and 6,) the positions of these feed-wheels being also indicated by Fig. 1. The gang of feed-wheels are preferably made fast with the shaft 26, and they are arranged to work in the slots 25, so that the toothed edges of the wheels will project through the slots and beyond the inner face of the slanting side 5ª, whereby the gang of feed-wheels will lie in the path of the meat or other substance resting on the trough-shaped bed. I may employ any suitable number of these feed-wheels, although I have shown five of them in the gang, and these feed-wheels may be of any suitable construction. The feed-wheels are disposed in that side of the bed opposite to the side from which the post 8 extends upwardly, and thus the feed-wheels lie in one side of the bed, while the opposite side thereof is adapted to be traversed by the swinging cover-frame and the knife thereon, the gang of feed-wheels thus lying on the distant side of the bed. The function of these feed-wheels is to engage with the meat and prevent it from being displaced by the swinging motion of the cutter, and these feed-wheels operate to advance the upper and lower parts of the meat uniformly and regularly, thus preventing the knife from cutting the meat in tapering slices and insuring uniformity in thickness of the slice.

I have found that good results are obtained by employing feed-wheels which are of uniform size and have their teeth facing in the same directions; but better results are obtainable when the feed-wheels 28 at the lower part of the gang are made smaller than the feed-wheels 29 at the upper part of the shaft and by making the teeth of the lower and smaller feed-wheels 28 face or "hook" in an opposite direction to the inclination of the teeth on the larger and upper feed-wheels 29 of the series.

The lower feed-wheels 28 engage with the meat resting on the bed, so as to be turned by the sliding movement which is given to the meat by the advancement of the slide 15, and as these wheels 28 are fast with the shaft 27 the latter will be rotated and positively turn the wheels 29 of the gang, said wheels engaging with the upper part of the meat and insuring the advancement of the meat uniformly throughout the area of the front end thereof. It will thus be understood that the gang of feed-wheels will be embedded in the meat, so as to prevent displacement thereof by frictional contact with the knife on the movement of the latter, and these feed-wheels will turn easily and freely in a direction which permits the advancement of the meat on the pushing action of the slide 15 without hindrance.

Another improvement which I have made in the machine is the claw 30, which is attached to the feed-slide 15 and projects forwardly beyond the front side thereof. (See Figs. 1 and 2.) This claw is provided at its free end with a lip 31, having a serrated or toothed edge adapted to be embedded in the meat, and the rear end of the claw is provided with a ball-shaped head 32, said rear part of the claw being reduced in size in order that it may fit in an inclined slot 33, which is provided in the feed-slide 15. The slot allows the easy application of the headed rear end of the claw into the slide, and this head is adapted to bear at its top edge against a curved flange 34, provided on the upper edge of the slide 15. The lower side of the head 32 is engaged by a clamp 35, arranged on the rear face of the slide 15 and pivoted thereto by a screw or bolt 36, which is fastened to the slide on one side of the slot 33. The free end of the clamp 35 is engaged by the headed end of the bolt 37, which passes through an opening in the flange 34 and is equipped with a winged thumb-nut 38, the latter adapted to bear on the top of the slide 15. This nut and bolt may be tightened to draw the clamp 35 forcibly into engagement with the head 32, and the clamp serves to hold the claw firmly in any desired position. The head 32 allows the claw to be adjusted up or down and crosswise with relation to the head, and the claw may also be turned so as to change the angle of presentation of the serrated flange to the meat, whereby the claw may be adjusted to engage with pieces of meat which vary in shape and size. The claw projects forwardly from the slide by which it is carried, so as to be advanced with the slide under the action of the feed mechanism, and this claw is intended to engage with one side of the meat while the feed-wheels engage with the other side of the meat, thus making the claw and the gang of feed-wheels coöperate with the bed and the feed-slide in properly presenting the front end of the meat to the cutter mechanism.

It is necessary to arrest the advancement of the slide 15 before it reaches the front end of the bed, because the claw 30 projects beyond the front end of the slide. To accomplish this end, I provide the slide with a triparm 39, which is fastened to the sleeve 17 to project beyond the front end of the slide, said arm terminating in a beveled nose 40 and being provided with a guide-sleeve 41, fitted loosely on the screw 18. (See Fig. 2.) The nose 40 of the arm is adapted to engage the pawl-lever 22 and lift the same, so that the pawl cannot engage the ratchet 21, thus arresting the rotation of the screw and the feed of the slide 15.

Although I have described the machine as essentially adapted for cutting meat, it is evident that it may be used to slice other substances.

Although I have shown and described my improvement as applied to a meat-cutter having a swinging knife, it is to be understood that the same may be used on other styles of meat-cutters, such as those which use a rotary cutter.

Having thus described my invention, I claim as new and desire to secure by Letters Patent—

1. A cutting apparatus having a bed, an idly-mounted feeder provided with two sets of wheels rigidly connected together and having oppositely-inclined teeth extending into the path of material to be placed on the bed, and means whereby the material may be advanced, the movement of the material operating the feeder through one set of teeth thereon.

2. A cutting apparatus having a bed, a rotary feeder mounted on the bed and having two sets of toothed wheels rigidly connected together, the teeth of one set of wheels being disposed oppositely to the teeth on the other set of wheels, and a feed mechanism traversing the bed.

3. A cutting apparatus having a bed provided with openings, a revoluble feeder comprising a shaft and a gang of toothed wheels rigidly connected together by said shaft, certain of said wheels being smaller than the remaining wheels of the gang and the teeth of certain wheels being inclined in opposite directions to the teeth of other wheels, and means for advancing material to be placed on the bed.

4. A cutting apparatus of the class described, having a bed, a cutter mechanism, a shaft mounted in the bed close to the path of the cutter mechanism, and a gang of feed-wheels rigidly connected together by said shaft, certain of said feed-wheels having teeth extending in an opposite direction to the teeth on other feed-wheels of the series.

5. In a cutting-machine, the combination with a bed and a feed-slide, of an arm extending forward from the slide and above the bed, provided with a claw at its forward end; and a universally-adjustable clamp connection between the rear end of the slide and the arm.

6. In a cutting apparatus of the class described, a slide, a claw having a ball-shaped head, and a clamp carried by the slide and engaging with said head to clamp the claw adjustably to the slide.

7. In a cutting apparatus of the class described, the combination of a bed, a cutter mechanism, a gang of feed-wheels rigidly connected together and idly mounted in said bed on one side thereof, a slide, and a claw fastened adjustably to the slide and disposed in a forwardly-projecting position relative to the slide to engage with the opposite side of the material from that side adapted to be engaged by the gang of feed-wheels.

In testimony whereof I have signed my name to this specification in the presence of two subscribing witnesses.

ALFRED W. JOHNSON.

Witnesses:
WILLIAM H. BENNETT,
CHARLES W. LARASON.